United States Patent
Machii et al.

(10) Patent No.: US 8,789,571 B2
(45) Date of Patent: Jul. 29, 2014

(54) PREPREG MANUFACTURING DEVICE

(75) Inventors: Akihiko Machii, Joetsu (JP); Kazunari Imai, Joetsu (JP); Masaaki Hirai, Joetsu (JP)

(73) Assignee: Arisawa Mfg. Co., Ltd., Joetsi-Shi (JP)

( * ) Notice: Subject to any disclaimer, the term of this patent is extended or adjusted under 35 U.S.C. 154(b) by 997 days.

(21) Appl. No.: 12/681,561

(22) PCT Filed: Dec. 25, 2007

(86) PCT No.: PCT/JP2007/074811
§ 371 (c)(1),
(2), (4) Date: Apr. 2, 2010

(87) PCT Pub. No.: WO2009/044493
PCT Pub. Date: Apr. 9, 2009

(65) Prior Publication Data
US 2010/0236722 A1  Sep. 23, 2010

(30) Foreign Application Priority Data
Oct. 3, 2007  (JP) .................................. 2007-260085

(51) Int. Cl.
B29C 47/00 (2006.01)
B29C 65/18 (2006.01)

(52) U.S. Cl.
USPC ............................. 156/499; 156/500; 156/546

(58) Field of Classification Search
None
See application file for complete search history.

(56) References Cited

U.S. PATENT DOCUMENTS

| 4,377,617 A | * | 3/1983 | Ikei et al. | 428/214 |
| 4,466,847 A | * | 8/1984 | Held | 156/166 |
| 5,137,787 A | * | 8/1992 | Shepherd | 428/423.7 |
| 7,074,292 B2 | * | 7/2006 | Ishigaki et al. | 156/244.19 |
| 2007/0052128 A1 | * | 3/2007 | Taylor | 264/175 |

FOREIGN PATENT DOCUMENTS

| JP | 58-186109 A | | 10/1983 |
| JP | 05156047 A | * | 6/1993 |
| JP | 07-173305 A | | 7/1995 |
| JP | 07-290449 A | | 11/1995 |
| JP | 11-309716 A | | 11/1999 |
| JP | 2003-138041 A | | 5/2003 |

OTHER PUBLICATIONS

International Search Report for International Application No. PCT/JP2007/074811, dated Feb. 12, 2008, 3 pages.
Japanese Office Action issued on Jan. 28, 2013 in counterpart Japanese Application No. 2007-260085.

* cited by examiner

Primary Examiner — Barbara J Musser
(74) Attorney, Agent, or Firm — Sughrue Mion, PLLC

(57) ABSTRACT

An extremely practical prepreg manufacturing device whereby a fiber body can be easily impregnated with a high-viscosity, low-concentration thermosetting resin using existing hot-melt method equipment, without having to use a solvent. In a prepreg manufacturing device for manufacturing a prepreg (5) by laminating and heating a resin sheet (4) formed by laminating a resin (3) with a release film (2), a resin sheet feeding mechanism (6) for feeding the resin sheet (4) laminated with a conveyed fiber body (1) comprises a release film feeding part (7) for feeding the release film (2), and a resin application part (8) for applying the resin (3) on the release film (2), the resin (3) containing a solvent. The resin sheet feeding mechanism (6) is configured so that the fiber body (1) is laminated with the resin sheet (4) formed by laminating the resin (3) with the release film (2), without the resin sheet (4) being formed into a roll shape.

7 Claims, 2 Drawing Sheets

FIG. 2

|  | Working Example 1 | Comparative Example 1 |
|---|---|---|
| Substrate used | Torayca T700SC-12K | Torayca T700SC-12K |
|  | Unidirectional, 200 g/m² | Unidirectional, 200 g/m² |
| Resin used | Polyimide | Polyimide |
| Dilution solvent | NMP | NMP |
| Resin solids concentration (%) | 35 | 35 |
| Resin viscosity (Pa·s/30°C) | 5.0 | 5.0 |
| Application method | Resin film roll coating | Free dipping |
| Roll gap | 400 μm | — |
| Resin pick-up (%) | 37 (target value: 37) | 20 (target value: 37) |
|  | Measurement method: JIS K 7071 "Testing Methods for Prepreg, Carbon Fiber and Epoxy Resins" | |
| Volatile matter content (%) | 25 | 25 |
|  | Measurement method: JIS K 7071 "Testing Methods for Prepreg, Carbon Fiber and Epoxy Resins" | |
| PP state | Good | Poor<br>Uneven resin pick-up and excessive nap |

US 8,789,571 B2

PREPREG MANUFACTURING DEVICE

TECHNICAL FIELD

The present invention relates to a prepreg manufacturing device.

BACKGROUND ART

Woven fiber bodies (carbon-fiber fabrics) formed from a plurality of carbon fiber filaments bundled using a sizing agent and woven as warp and weft threads (the bundles hereinafter referred to as "fiber bundles" or simply "threads"), or unidirectional fiber bodies having such threads arranged in one direction, are, e.g., uniformly impregnated with epoxy resin or the like to form a prepreg. A plurality of such prepregs are laminated and cured to form lightweight, high-strength composite materials; therefore, composite materials made of carbon fiber fabric in particular are widely used in aircraft materials, automotive applications, and other fields.

Prepreg manufacturing methods that have been commonly used in recent years include a "hot-melt" method in which a resin sheet formed by laminating a thermosetting resin on a release film is layered on one or both sides of a fiber body and heated/pressed while the fiber body is continuously conveyed along a guide, whereby the fiber body is impregnated with the resin, as disclosed in Patent Documents 1 and 2, for example.

In the hot-melt method, the resin sheet is manufactured by a separate process and wound onto a winding roll in the same manner as the fiber body, and the fiber body can be impregnated with the resin merely by unrolling the fiber body and the resin sheet from the respective winding rolls or the like thereof, and laminating and heating for impregnation. The hot-melt method therefore requires only a small number of steps using simple equipment.

[Patent Document 1] Japanese Laid-open Patent Publication No. 11-309716
[Patent Document 2] Japanese Laid-open Patent Publication No. 2003-138041

DISCLOSURE OF THE INVENTION

Problems to be Solved by the Invention

However, in the hot-melt method, the resin sheet must be manufactured in a separate process and wound on a roll; therefore, in order to prevent the resin applied on the release film from exuding from both sides when in a roll, the resin must remain solid enough not to run off from the release film. Specifically, the resin must not contain a solvent and must have a high viscosity at low temperature (normal temperature) (a resin that does not remain solid on the release film runs off from the release film when rolled, and therefore cannot be used).

A considerable number of thermosetting resins having a high viscosity (about 50 Pa·s/30° C.) and a low solids concentration (less than 10%) exhibit excellent characteristics when used in a composite material, but such thermosetting resins having high viscosity and low solids concentration are difficult to utilize in a hot-melt method for such reasons as described below.

Specifically, a high viscosity makes the resin difficult to apply to the release film, and when a solvent is used to reduce the viscosity, the resin leaves the release film when the resin sheet is rolled. Since the solids concentration is further reduced by the solvent, the impregnation step must be repeated in order for the fiber body to be impregnated with a predetermined amount of resin, and productivity is significantly reduced. It is also known that the mechanical characteristics of a composite material composed of prepregs that are formed using a solvent-containing resin are adversely affected by the presence of the solvent, and the abovementioned resin is undesirable for this reason as well.

A method ("free dipping") in which a fiber body is impregnated with a resin by being dipped in a thermosetting resin diluted with a solvent is also known as a prepreg manufacturing method other than the hot-melt method. In this method, however, because of low concentration, the fiber body must be dipped repeatedly or for a long time in order to become impregnated with the predetermined amount of resin, and productivity is severely reduced. Since a solvent is also used, the mechanical characteristics are adversely affected in the same manner as described above.

The present invention was developed in view of such problems as those described above, and an object of the present invention is to provide a highly practical prepreg manufacturing device whereby a fiber body can be easily impregnated with a high-viscosity, low-concentration thermosetting resin without the use of a solvent and using existing equipment for the hot-melt method, without the need for specialized equipment.

Means Used to Solve the Above-Mentioned Problems

The present invention will be summarized with reference to the attached drawings.

A first aspect of the present invention is a prepreg manufacturing device for laminating a fiber body 1 with a resin sheet 4 while the fiber body 1 is continuously conveyed, heating the laminated article to cause the fiber body 1 to be impregnated with the resin 3, and manufacturing a prepreg 5, wherein the resin sheet 4 comprises a resin 3 laminated on a release film 2, and the fiber body 1 is formed from a plurality of bundled fiber filaments woven as warp and weft threads, or is formed from a plurality of bundled fiber filaments arranged in a single direction; wherein the prepreg manufacturing device is characterized in that a resin sheet feeding mechanism 6 for feeding the resin sheet 4 laminated with the conveyed fiber body 1 comprises a release film feeding part 7 for feeding the release film 2, and a resin application part 8 for coating the release film 2 with the resin 3, which contains a solvent; the resin sheet feeding mechanism 6 is configured so that the resin sheet 4 formed by laminating the resin 3 containing a solvent with the release film 2 is laminated with the fiber body 1 without forming the resin sheet 4 into the shape of a roll; a solvent removing part 12 is provided for heating the fiber body 1 and the resin sheet 4 in a state in which the resin sheet 4 is laminated with the fiber body 1, and removing the solvent from the resin 3 of the resin sheet 4; and a heating part 13 for use in resin impregnation is provided for impregnating the fiber body 1 with the resin 3 of the resin sheet 4, the solvent of the resin 3 having been removed by the solvent removing part 12 and the viscosity of the resin 3 increased, and the heating part 13 being provided downstream of the solvent removing part 12 in the conveyance direction of the fiber body 1.

A second aspect of the present invention is the prepreg manufacturing device according to the first aspect, wherein the prepreg manufacturing device is characterized in that a thermosetting resin having a viscosity of 0.5 to 50 Pa·s/30° C. and a solids concentration of 10 to 50% is used as the resin 3.

A third aspect of the present invention is the prepreg manufacturing device according to the second aspect, wherein the prepreg manufacturing device is characterized in that a polyimide, a bismaleimide, or a polyamide imide is used as the resin 3.

A fourth aspect of the present invention is the prepreg manufacturing device according to the first aspect, wherein the prepreg manufacturing device is characterized in that a thermoplastic resin is used as the resin 3.

A fifth aspect of the present invention is the prepreg manufacturing device according to the third aspect, wherein the prepreg manufacturing device is characterized in that the resin sheet feeding mechanism 6 is configured so that the resin sheet 4 in which the resin 3 is applied to an upper surface of the release film 2 by the resin application part 8 is laminated with a bottom surface of the fiber body 1 so that said resin 3 is oriented toward the fiber body 1 while being laminated with the upper surface of the release film 4.

A sixth aspect of the present invention is the prepreg manufacturing device according to the fourth aspect, wherein the prepreg manufacturing device is characterized in that the resin sheet feeding mechanism 6 is configured so that the resin sheet 4 in which the resin 3 is applied to an upper surface of the release film 2 by the resin application part 8 is laminated with a bottom surface of the fiber body 1 so that said resin 3 is oriented toward the fiber body 1 while being laminated with the upper surface of the release film 4.

A seventh aspect of the present invention is the prepreg manufacturing device according to the fifth aspect, wherein the prepreg manufacturing device is characterized in that a slit part 9 is provided to the resin application part 8, and the amount of resin to be applied can be controlled by adjusting the width of the slit part 9.

An eighth aspect of the present invention is the prepreg manufacturing device according to the sixth aspect, wherein the prepreg manufacturing device is characterized in that a slit part 9 is provided to the resin application part 8, and the amount of resin to be applied can be controlled by adjusting the width of the slit part 9.

A ninth aspect of the present invention is the prepreg manufacturing device according to the seventh aspect, wherein the prepreg manufacturing device is characterized in that the resin application part 8 is provided with a roll body 10 for synchronously rotating at the conveyance speed of the fiber body 1; and a resin extrusion part 11 for rotating together with the roll body 10 and extruding the resin 3 from the slit part 9 onto the release film 2, the resin extrusion part 11 being provided to the roll body 10.

A tenth aspect of the present invention is the manufacturing device according to the eighth aspect, wherein the prepreg manufacturing device is characterized in that the resin application part 8 is provided with a roll body 10 for synchronously rotating at the conveyance speed of the fiber body 1; and a resin extrusion part 11 for rotating together with the roll body 10 and extruding the resin 3 from the slit part 9 onto the release film 2, the resin extrusion part 11 being provided to the roll body 10.

An eleventh aspect of the present invention is the prepreg manufacturing device according to the first aspect, wherein the prepreg manufacturing device is characterized in that the angle of incidence of the resin sheet 4 when the resin sheet 4 is laminated with the fiber body 1 is set to 10 to 30°.

A twelfth aspect of the present invention is the prepreg manufacturing device according to any of the first through eleventh aspects, wherein the prepreg manufacturing device is characterized in that the fiber filaments are carbon-fiber filaments.

Effect of the Invention

Through the configuration of the present invention described above, an extremely practical prepreg manufacturing device is provided whereby a fiber body can be easily impregnated with a high-viscosity, low-concentration thermosetting resin without the use of a solvent and using existing equipment for the hot-melt method, without the need for specialized equipment.

BEST MODE FOR CARRYING OUT THE INVENTION

Preferred embodiments of the present invention are briefly described below with reference to the drawings while indicating the effects of the present invention.

A resin sheet 4 in which a resin 3 containing a solvent is applied on a release film 2 can be laminated with and heat-impregnated into a fiber body 1 without being rolled, and accordingly there is no need to manufacture the resin sheet 4 by a separate process.

Since the resin sheet 4 can be laminated with the fiber body 1 without being rolled, a solvent can be included in the resin 3 when the resin 3 is applied on the release film 2. Specifically, even when the resin 3 includes a solvent, the resin 3 can be laminated with the fiber body 1 without exuding from the release film 2, and the fiber body 1 can be efficiently and continuously impregnated into the resin 3 in the same manner as in the hot-melt method even when the resin has a high viscosity and a low solids concentration (e.g., a thermosetting resin having a viscosity of 0.5 to 50 Pa·s/30° C. and a solids concentration of 10 to 50%).

A single device can be used to manufacture the resin sheet 4 and impregnate the fiber body 1 with the resin 3. The work can be correspondingly simplified, and prepregs can be manufactured with consistent quality.

Embodiments

Specific embodiments of the present invention will be described based on the drawings.

The present embodiment is a prepreg manufacturing device for laminating a fiber body 1 with a resin sheet 4 while continuously conveying the fiber body 1, wherein the fiber body 1 is formed by arranging threads in which a plurality of fiber filaments is sized, the threads being arranged in one direction, and the resin sheet 4 comprising a resin 3 laminated on a release film 2 and manufacturing a prepreg 5 by heat-impregnating the resin 3 into the fiber body. A resin sheet feeding mechanism 6 for feeding the resin sheet 4 laminated with the conveyed fiber body 1 comprises a release film feeding part 7 for feeding the release film 2, and a resin application part 8 for applying the resin 3 containing a solvent on the release film 2; and the resin sheet feeding mechanism 6 is configured so as to laminate the fiber body 1 with the resin sheet 4 formed by laminating the resin 3 containing a solvent with the release film 2, without rolling the resin sheet 4.

A thermoplastic resin having a viscosity of 0.5 to 50 Pa·s/30° C. and a solids concentration of 10 to 50% is used as the resin 3 in the present embodiment. Specifically, polyimide having a viscosity of 5.0 Pa·s/30° C. and a solids concentration of 30% is used. The resin is not limited to polyimide; bismaleimide, polyamide imide, or another resin may also be used, or a thermoplastic resin may be used.

In the present embodiment, carbon-fiber filaments are used, but aramid fibers or other fiber filaments may also be used. A unidirectional fiber body is used as the fiber body in the present embodiment, but a woven fiber body in which warp threads and weft threads are woven may also be used.

Each component will be specifically described.

A plurality of threads (carbon-fiber bundles) in which a plurality of carbon-fiber filaments is sized is taken from a CF roving 15, arranged in one direction, and guided and conveyed by guide rolls 20 as a fiber body 1. The conveyance speed of the fiber body 1 is controlled by adjusting the rotation speed of six pullers 14.

The resin sheet feeding mechanism 6 is provided in a position below the conveyed fiber body 1.

The release film feeding part 7 for feeding the release film 2 in the resin sheet feeding mechanism 6 is composed of a winding roll 17 onto which the release film 2 is wound, and a plurality of guide rolls 26 for guiding the release film 2.

The resin application part 8 is provided with a roll body (free roll) for synchronously rotating at the conveyance speed (rotation speed of the pullers) of the fiber body 1, and a resin extrusion part 11 for rotating together with the roll body 10 and extruding the resin 3 from a slit part 9 having a slit width of approximately several hundred microns onto the release film 2, the resin extrusion part 11 being provided to the roll body 10.

Consequently, since the roll body 10 rotates at the conveyance speed (prepreg manufacturing speed) of the fiber body 1, there is no need to set the speed of the roll body 10 according to the manufacturing speed, and the resin 3 can always be applied at a consistent rate.

The resin extrusion part 11 is configured so that the resin 3 is retained between the roll body 10 and a bottom panel 25 that is attached to the external peripheral part of the roll body 10, and so that the resin 3 is extruded onto the release film 2 via the slit part 9 at an angle in conjunction with the rotation of the roll body 10. Consequently, the resin 3 extruded via the slit part 9 is laminated at a predetermined thickness onto the release film 2 that passes through the slit part 9.

The release film 2 guided by the guide rolls 26 passes between the resin extrusion part 11 and the roll body 10 (in a groove through which the release film 2 can pass, provided to a portion of the contacting part between the bottom panel 25 and the roll body 10), runs around the roll body 10 so as to pass between the roll body 10 and a slit roll 16 that is provided at a predetermined distance from the roll body 10, and is conveyed toward the lower surface of the fiber body 1. The slit roll 16 is provided downstream of the resin extrusion part 11 in the conveyance direction of the release film 2.

Consequently, the resin 3 can be appropriately extruded and applied onto the release film 2 (by "roll coating" for applying the resin using the roll body 10 and the slit roll 16) from the resin extrusion part 11 in conjunction with the rotation of the roll body 10 rotating at the conveyance speed of the fiber body 1. The amount of resin 3 applied to the release film 2 can also be easily controlled by appropriately adjusting the position of the slit roll 16 to vary the slit width of the slit part 9, and the amount of resin can be set according to the application.

The resin sheet feeding mechanism 6 is configured so that the resin sheet 4 formed by laminating the solvent-containing resin 3 on the upper surface of the release film 2 is laminated with the lower surface of the fiber body 1 substantially linearly and without being rolled (without being wound or curved), so that the resin 3 is oriented toward the fiber body 1 while still laminated with the upper surface of the release film 2.

Consequently, the solvent-containing resin 3 can be laminated onto the fiber body 1 without coming off the release film 2 and with minimal deformation of the release film 2, so that there is no need to roll the release film 2 as in the conventional hot-melt method. Therefore the fiber body 1 can be readily impregnated by various resins hitherto impossible to apply using the hot-melt method.

Since the resin 3 includes a solvent and is prone to delaminate from the release film 2, and the resin aggregates on the release film 2 when left for long periods of time, such that a uniform resin sheet 4 is not obtained, the distance from the slit part 9 to the fiber body 1 is preferably set as short as possible. A distance of 3000 mm or less is specifically preferred.

The angle of incidence of the resin sheet 4 from the roll body 10 with respect to the fiber body 1 is set to 10 to 30°. When this angle is less than 10°, the structure of the device prevents the rolls from being set, and other problems occur, and when the angle exceeds 30°, the resin sags due to gravity. This angle is set to 17° in the present embodiment.

A solvent removing part 12 (heating panel) for heating and removing the solvent from the resin 3 of the resin sheet 4 while laminating the resin sheet 4 with the fiber body 1 (immediately after the resin sheet 4 is placed over the fiber body 1) is provided in a position downstream in the conveyance direction from the point of contact between the fiber body 1 and the resin sheet 4. The temperature of heating by the solvent removing part 12 is set to 80 to 180° C. The solvent is not adequately evaporated when the heating temperature is less than 80° C., and the viscosity decreases and the resin aggregates when the heating temperature exceeds 180° C. The heating temperature is set to 160° C. in the present embodiment.

Consequently, the solvent can be promptly removed by the solvent removing part 12 from the solvent-containing resin 3 that is prone to delaminate, and the viscosity thereof can be increased. The fiber body 1 can also be satisfactorily impregnated by the resin 3 in a heating part 13 described hereinafter.

A protective film feeding part for feeding a protective film 30 provided to the upper surface of the fiber body 1 is provided in a position downstream from the solvent removing part 12 in the conveyance direction. The protective film feeding part is composed of a winding roll 18 onto which the protective film 30 is wound, and guide rolls 27 for guiding the protective film 30.

The heating part 13 (heating panel) for resin impregnation is provided in a position downstream in the conveyance direction from the position at which the protective film 30 is fed by the protective film feeding part. The fiber body 1 is impregnated by the resin 3 by the heating part 13, and a prepreg 5 is formed. The temperature of heating by the heating part 13 is set to 50 to 150° C. The viscosity of the resin is not adequately reduced when the temperature is less than 50° C., and non-impregnated portions appear in the prepreg. The viscosity is reduced excessively when the heating temperature exceeds 150° C., and the resin runs off. The heating temperature is set to 100° C. in the present embodiment.

Consequently, through parallel arrangement of the heating panel of the solvent removing part 12 and the heating panel of the heating part 13, the drying state of the prepreg can be set as desired, and a prepreg that is adapted to the application can easily be manufactured.

A pair of heat-laminating rolls 23 is provided in a position downstream in the conveyance direction from the heating part 13. The prepreg 5 is flattened by being passed through this pair of heat-laminating rolls 23.

A protective film recovering part for recovering the protective film 30 from the flattened prepreg 5 is provided in a position downstream from the heat-laminating rolls 23 in the conveyance direction. The protective film recovering part is composed of a winding roll 19 for winding the protective film 30, and guide rolls 28 for guiding the protective film 30.

A separator feeding part for feeding a separator 31 to the upper surface of the prepreg 5 is provided in a position downstream in the conveyance direction from the position at which the protective film 30 is recovered by the protective film recovering part. The separator feeding part is composed of a winding roll 22 onto which the separator 31 (polyethylene film) is wound, and a guide roll 29 for guiding the separator 31.

A winding roll 24 onto which the prepreg 5 is wound is provided in a position downstream in the conveyance direction from the position at which the separator 31 is fed by the separator feeding part.

Specifically, the steps subsequent to the resin sheet feeding mechanism 6, and the removal of the solvent from the resin 3 of the resin sheet 4 fed by the resin sheet feeding mechanism 6, can be performed in the same manner as in the conventional hot-melt method; and existing equipment can be utilized to correspondingly facilitate execution of the subsequent steps.

Since the present embodiment is configured as described above, a resin sheet 4 in which a resin 3 containing a solvent is applied on a release film 2 can be laminated with and heat-impregnated into a fiber body 1 without being rolled, and there is accordingly no need to manufacture the resin sheet 4 by a separate process.

Since the resin sheet 4 can be laminated with the fiber body 1 without being rolled, a solvent can be included in the resin 3 when the resin 3 is applied on the release film 2. Specifically, even when the resin 3 includes a solvent, the resin 3 can be laminated with the fiber body 1 without leaving the release film 2, and the fiber body 1 can be efficiently and continuously impregnated with the resin 3 in the same manner as in the hot-melt method even when the resin has a high viscosity and a low solids concentration (e.g., a thermosetting resin having a viscosity of 0.5 to 50 Pa·s/30° C. and a solids concentration of 10 to 50%).

A single device can be used to manufacture the resin sheet 4 and impregnate the fiber body 1 with the resin 3. The work can be correspondingly simplified, and prepregs can be manufactured with consistent quality.

The present embodiment therefore has extreme practicality whereby a fiber body can be readily impregnated with a high-viscosity, low-concentration thermosetting resin without the use of a solvent and using existing equipment for the hot-melt method, without the need for specialized equipment.

An experimental example that exemplifies the effects of the present example will be described.

The resin pick-up and the volatile matter content of a prepreg (Comparative Example 1) manufactured by the conventional free dipping method and a prepreg (Working Example 1) manufactured using the device (having a roll gap (slit width) of 400 μm) according to the present embodiment described above were measured, and the PP state was observed. As shown in FIG. 2, the substrate, the resin, the dilution solvent, the resin solids concentration, and the resin viscosity were the same for each of the examples.

FIG. 2 shows that in Working Example 1 the target resin pick-up was achieved and the PP state was excellent, whereas in Comparative Example 1 the target resin pick-up was not achieved and the PP state was poor.

BRIEF DESCRIPTION OF THE DRAWINGS

FIG. 2 is a table showing the experimental conditions and results.

Figure 1:
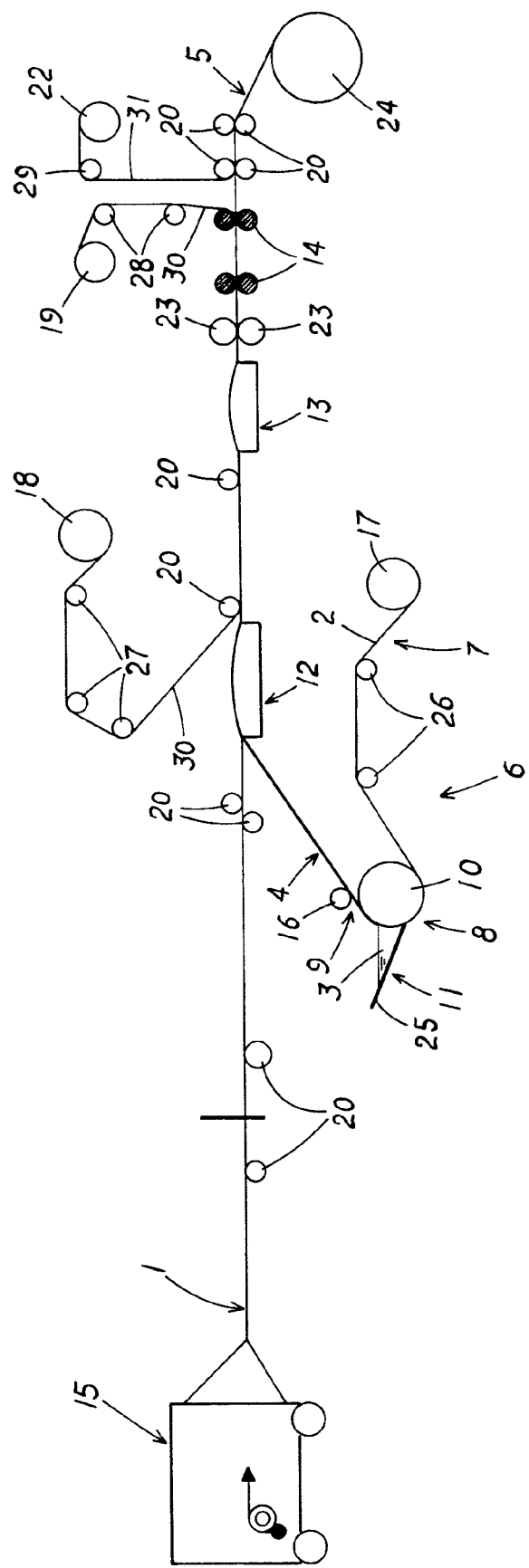
FIG. 1 is a schematic view showing the present embodiment.

The invention claimed is:

1. A prepreg manufacturing device for laminating a fiber body with a resin sheet while the fiber body is continuously conveyed to form a laminated article, heating the laminated article to cause the fiber body to be impregnated with the resin, and manufacturing a prepreg, wherein the resin sheet comprises a resin laminated on a release film, and the fiber body is formed from a plurality of bundled fiber filaments woven as warp and weft threads, or is formed from a plurality of bundled fiber filaments arranged in a single direction; said prepreg manufacturing device comprising:

a resin sheet feeding mechanism configured to form said resin sheet and to feed said resin sheet to the fiber body while the fiber body is being conveyed at a conveyance speed, including: a release film feeding part, and a resin application part configured to coat said release film with said resin, which contains a solvent, wherein the resin sheet feeding mechanism is configured to form the resin sheet and to feed the resin sheet to the fiber body being conveyed at the conveyance speed without forming the resin sheet into the shape of a roll;

downstream from the resin sheet feeding mechanism, a solvent removing part configured to heat said fiber body and said resin sheet in a state in which said resin sheet is laminated with said fiber body to form a laminated article, and to remove the solvent from said resin of said resin sheet, wherein said solvent removing part has a heating temperature of 80 to 180° C.;

downstream from said solvent removing part, a heating part configured to heat the laminated article and to impregnate said fiber body with said resin of said resin sheet while the laminated article is being continuously conveyed at the conveyance speed of the fiber body, the solvent of said resin having been removed by said solvent removing part and the viscosity of the resin increased, wherein the heating part has a heating temperature of 50 to 150° C.; and a protective film application part disposed between the solvent removing part and the heating part, configured to apply a protective film to the upper surface of the fiber body as it is continuously conveyed to the heating part, wherein said resin application part is provided with a slit part, and the amount of resin to be applied is controlled by adjusting the width of the slit part, wherein said resin application part is provided with a roll body for synchronously rotating at the conveyance speed of said fiber body, a resin extrusion part for rotating together with the roll body and extruding said resin from said slit part onto said release film, the resin extrusion part being provided to the roll body, and wherein the angle of incidence of said resin sheet when said resin sheet is laminated with said fiber body is 10 to 30°, wherein the solvent removing part and the heating part do not impart pressure on the fiber body and the resin sheet.

2. The prepreg manufacturing device according to claim 1, said prepreg manufacturing device characterized in that a thermosetting resin having a viscosity of 0.5 to 50 Pa·s/30° C. and a solids concentration of 10 to 50% is used as said resin.

3. The prepreg manufacturing device according to claim 2, said prepreg manufacturing device characterized in that a polyimide, a bismaleimide, or a polyamide-imide is used as said resin.

4. The prepreg manufacturing device according to claim 3, said prepreg manufacturing device characterized in that said resin sheet feeding mechanism is configured so that said resin sheet in which said resin is applied to an upper surface of said release film by said resin application part is laminated with a bottom surface of the fiber body so that said resin is oriented toward said fiber body while being laminated with the upper surface of said release film.

5. The prepreg manufacturing device according to claim 1, said prepreg manufacturing device characterized in that a thermoplastic resin is used as said resin.

6. The prepreg manufacturing device according to claim 5, said prepreg manufacturing device characterized in that said resin sheet feeding mechanism is configured so that said resin sheet in which said resin is applied to an upper surface of said release film by said resin application part is laminated with a bottom surface of the fiber body so that said resin is oriented toward said fiber body while being laminated with the upper surface of said release film.

7. The prepreg manufacturing device according to any one of claims 1-6, said prepreg manufacturing device characterized in that said fiber filaments are carbon-fiber filaments.

* * * * *